137-13

4/4/78 SR

XR 4,082,109

United States Patent [19] [11] 4,082,109

Sun et al. [45] Apr. 4, 1978

[54] HEAT PIPE ACTUATED VALVE

[75] Inventors: Tsu-Hung Sun, Torrance; Algerd Basiulis, Redondo Beach, both of Calif.

[73] Assignee: Hughes Aircraft Company, Culver City, Calif.

[21] Appl. No.: 720,339

[22] Filed: Sep. 3, 1976

[51] Int. Cl.$^2$ .......................... G05D 7/03; F16K 13/00

[52] U.S. Cl. .......................... 137/340; 137/13; 165/105

[58] Field of Search .................. 137/13, 340, 802, 807, 137/828; 165/105; 251/369

[56] References Cited

U.S. PATENT DOCUMENTS

| | | | |
|---|---|---|---|
| 338,447 | 3/1886 | Snee | 137/13 |
| 2,529,915 | 11/1950 | Chausson | 165/105 X |
| 3,603,379 | 9/1971 | Leonard | 165/105 X |
| 3,677,275 | 7/1972 | Lovelock | 137/828 X |
| 3,735,769 | 5/1973 | Miller | 137/13 |
| 3,817,321 | 6/1974 | von Cube | 165/105 |
| 3,943,964 | 3/1976 | Asselman | 137/13 X |

FOREIGN PATENT DOCUMENTS

| | | | |
|---|---|---|---|
| 396,508 | 11/1971 | U.S.S.R. | 137/13 |

*Primary Examiner*—Robert G. Nilson
*Attorney, Agent, or Firm*—Lewis B. Sternfels; W. H. MacAllister

[57] ABSTRACT

A heat pipe extends into the path of flow of a viscous fluid, e.g., polymer, for transferring heat from or to the flowing fluid and thereby for solidifying and stopping flow of the fluid or, conversely, for melting the solidified matter for resumed flow thereof. Control may simply increase or decrease the fluid viscosity for varying the rate of flow.

10 Claims, 3 Drawing Figures

HEAT PIPE ACTUATED VALVE

BACKGROUND OF THE INVENTION

1. Field of the Invention

The present invention relates to a valve and, more particularly, to such a valve controlled by a heat pipe.

2. Description of the Prior Art

A conventional freeze valve such as used in regulating the flow of polymers or other high viscosity fluids through a conduit, operates on the principle of circulating water to freeze the polymer. There is no provision, however, by which the flow can be readily be reactivated or its rate of flow be controlled.

SUMMARY OF THE INVENTION

The present invention overcomes the above problems by inserting one end of a heat pipe into matter which is capable of flow and of changing its viscosity. Heat transferred to or from flowing matter cause it to solidify or partially solidify or become more viscous to stop or slow down the flow of the matter. Heat transferred to the stopped or more viscous matter permits this flow to resume or to become less viscous.

It is therefore, an object of the present invention to provide for an efficient means of regulating the flow of matter capable of changing its viscosity.

Another object is to provide for an efficient method of regulation of the flow of such matter.

Other aims and objects as well as a more complete understanding of the present invention will appear from the following explaination of exemplary embodiments and the accompanying drawings thereof.

DESCRIPTION OF THE PREFERRED EMBODIMENTS

Figure 1:
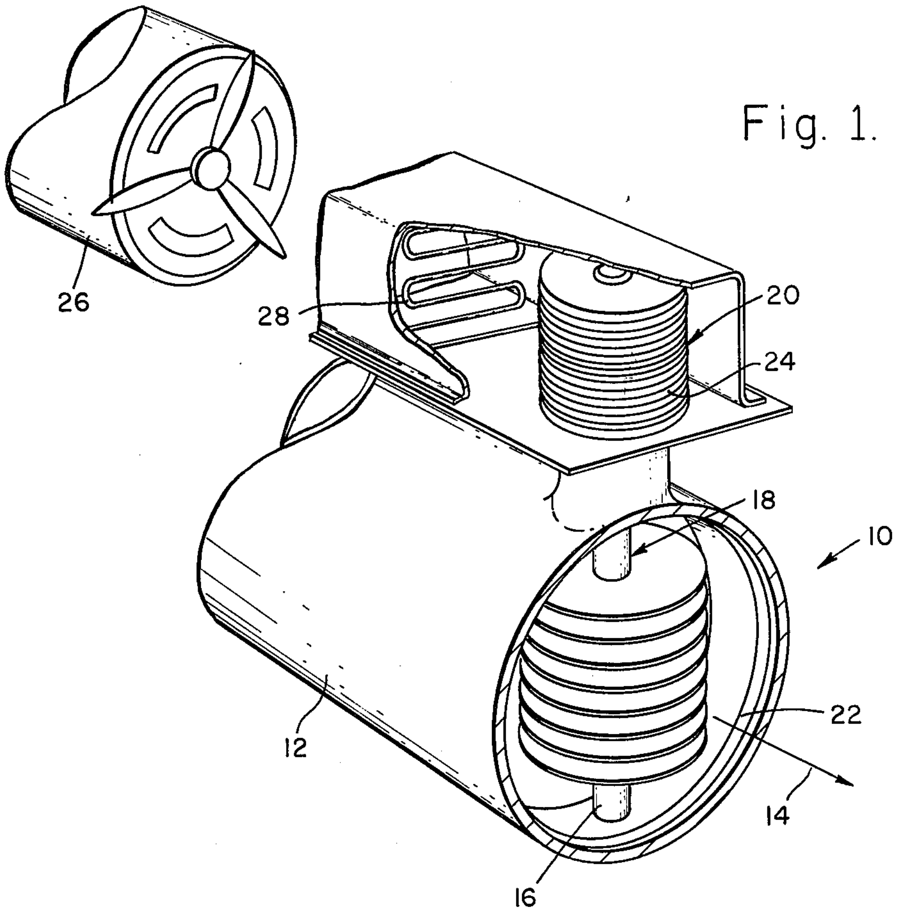
FIG. 1 depicts in general a first embodiment of the present invention.

Accordingly, referring to FIG. 1, a heat pipe actuated valve 10 has one end placed within a conduit 12 through which matter, generally depicted by an arrow 14, flows. Matter 14 is capable of changing its viscosity or physical states of solid, liquid and gas, in order for the present invention to be operable, and in general its preferred change of viscosity is from solid to liquid. However, it is to be understood that the change in viscosity may be solely within its liquid state, i.e., being more or less viscous. For example, the matter may be a flowing polymer or other high viscosity fluid.

Placed in the flow of matter 14 is one end 16 of a heat pipe 18. The other end 20 of heat pipe 18 extends outside of valve housing 22. It is preferred that fins 24 be secured to second end 20 so as to provide a large surface for transfer of heat to or from second end 20 of the heat pipe. Fins 24 may be bonded to heat pipe 18 by brazing, welding or forging.

As is well known in the art, a basic heat pipe consists of a closed container having within it a capillary wick structure which is saturated with a small amount of vaporizable fluid. The heat pipe employs an evaporation-condensation cycle with a capillary wick pumping the condensed fluid back to the heat input area or evaportor. In the present invention, the heat pipe is bidirectional, depending upon which end 16 or 22 is hotter than the other. Therefore, at one time end 20 may be the evaporator and end 16 the condenser and vice-versa. In any case, the low temperature drop between the evaporator and condenser results in an almost isothermal operation. Heat pipe materials for the envelope are selected on the basis of high thermal conductivity, strength and compatibility with the working fluid. Typical envelope materials are metals, although ceramics or glass may be used. If desired, an inert gas reservoir may be attached to the heat pipe to control the temperature at which it operates.

To provide capillary pumping, a varity of wick structures can be used such as screens, sintered powders, and grooves. After the wick is saturated with a working fluid, the heat pipe is then processed and sealed, with its operating temperature being dictated by the working fluid.

With respect to the embodiment shown at FIG. 1, the direction of heat flow within heat pipe 18 is dependent upon whether cooling air or heating air is passed by fins 24. To this end, a blower 26 causes air to be moved past fins 24 so that the cooling air enables heat to be transferred from end 16 to end 20 of the heat pipe. For heating purposes, a heater 28 is placed in the path of the cooling air from blower 26 and this heated air transfers its heat to fins 24 and thence from end 20 to end 16.

In operation, to shut off the flow of matter or to decrease its flow, blower 26 is actuated and heater 28 is turned off. Heat is removed from the matter passing through conduit 12 and valve 10 through heat pipe 28 by the forced cooling air. When the heat is removed from the flowing matter, it solidifies when a solid plug is formed which stops the flow. Alternately, the matter may become simply more viscous simply to slow the flow rate of the matter.

To cause the matter to flow again or to increase its flow rate, the heater is turned on as well as the blower so that the forced air from blower 26 is heated by heater 28. The heat of the hot air is then transferred to the matter in conduit 12 through heat pipe 18. The heat then melts or makes the matter less viscous and flow resumes or increases.

Figure 2:
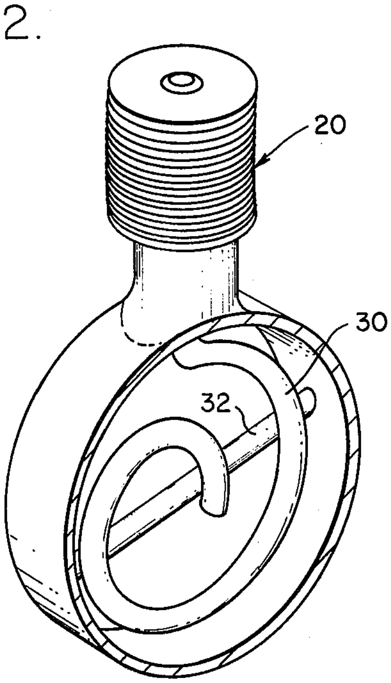
FIGS. 2 and 3 illustrate modifications of the embodiment shown in FIG. 1.
Figure 3:
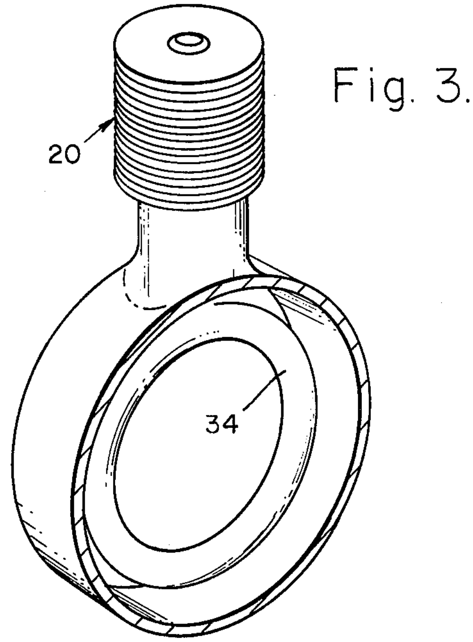

FIGS. 2 and 3 depict alternate configurations in which the first end of heat pipe 18, rather than being a straight element as shown in FIG. 1, is coiled according to indicium 30. Since spiral coil 30 has a free end, a stabilizing brace 32 may be used to support the first end. In FIG. 3, the second end section of the heat pipe comprises a doughnut-shaped hoop 34. In other respects, the embodiments of FIGS. 2 and 3 operate as in FIG. 1.

Although the invention has been described with reference to particular embodiments thereof, it should be realized that various changes and modifications may be made therein without departing from the spirit and scope of the invention.

What is claimed is:

1. A heat pipe actuated valve comprising:

means for defining a flow path for matter which is capable of changing its viscosity; and at least one bidirectional heat pipe thermally coupled to said matter for transferring heat from and to said matter and thereby for changing the viscosity of said matter and its rate of flow through said flow path means and for causing said matter itself to check, permit and regulate its own flow by means of its changed viscosity respectively by shutting, opening and partially obstructing said flow path means.

2. A heat pipe valve comprising:

a conduit;

matter capable of changing its viscosity for flow through said conduct; and at least one bidirectional heat pipe having first and second end sections, said first end section extending into said conduit and in the path of the flow of the matter for transferring heat from and to the matter and thereby for changing the viscosity of the matter and for causing said matter itself to check, permit and regulate its own flow by means of its changed viscosity respectively by shutting, opening and partially obstructing said conduit, and said second end section extending out of said conduit for transferring heat to and from said first section.

3. A valve as in claim 2 further including actuating means coupled to said heat pipe second end section for causing heat flow in said bidirectional heat pipe to move towards and away from said heat pipe first end section.

4. A valve as in claim 3 wherein said actuating means comprises heating and cooling apparatus.

5. A valve as in claim 4 wherein said cooling apparatus comprises a blower for blowing cooling air past said heat pipe second end section, thereby for inducing heat to be removed from the matter to said heat pipe first end section and thence to said heat pipe second end section.

6. A heat pipe actuated valve comprising:

means for defining a flow path of matter capable of changing its viscosity;

at least one bidirectional heat pipe having a first end section extending in the path of the flow of the matter and a second end section extending out of said flow path means, and for transferring heat from and to the matter and thereby for changing the viscosity of the matter and its rate of flow through said flow path means; and heating and cooling apparatus coupled to said heat pipe second end section for causing heat flow in said bidirectional heat pipe to move towards and away from said heat pipe first end section, said cooling apparatus comprising a blower for blowing cooling air past said heat pipe second end section, thereby for inducing heat to be removed from the matter to said heat pipe first end section and thence to said heat pipe second end section, and said heating apparatus comprising a heater positioned between said blower and said heat pipe second end section for heating the air and for blowing the heated air past said heat pipe second end section, thereby for transferring heat to said heat pipe first end section and to the matter.

7. A valve as in claim 4 further including fins secured to said heat pipe at said second section.

8. A valve as in claim 2, wherein said heat pipe first end section comprises a straight element with fins secured to and extending outwardly from said straight element in the path of flow of the matter.

9. A valve as in claim 2 wherein said heat pipe first end section has a spiral coil configuration.

10. A valve as in claim 2 wherein said heat pipe first end section has a general doughnut-shaped loop configuration.

* * * * *